US008364656B2

(12) United States Patent
Arora et al.

(10) Patent No.: US 8,364,656 B2
(45) Date of Patent: Jan. 29, 2013

(54) METHOD AND SYSTEM FOR IMPLEMENTING MULTIUSER CACHED PARAMETERIZED CELLS

(75) Inventors: Rajan Arora, Faridabad (IN); Randy Bishop, Pleasanton, CA (US); Arnold Ginetti, Antibes (FR); Gilles S. C. Lamant, Sunnyvale, CA (US)

(73) Assignee: Cadence Design Systems, Inc., San Jose, CA (US), `

( * ) Notice: Subject to any disclaimer, the term of this patent is extended or adjusted under 35 U.S.C. 154(b) by 1097 days.

(21) Appl. No.: 12/262,514

(22) Filed: Oct. 31, 2008

(65) Prior Publication Data
US 2010/0115207 A1 May 6, 2010

(51) Int. Cl.
*G06F 12/08* (2006.01)
(52) U.S. Cl. ......... 707/704; 716/136; 716/139; 711/144
(58) Field of Classification Search ............ 707/704; 716/136, 139
See application file for complete search history.

(56) References Cited

U.S. PATENT DOCUMENTS

| | | | |
|---|---|---|---|
| 5,511,197 A | 4/1996 | Hill et al. | |
| 5,802,349 A | 9/1998 | Rigg et al. | |
| 5,841,663 A | 11/1998 | Sharma et al. | |
| 6,067,477 A * | 5/2000 | Wewalaarachchi et al. | 700/83 |
| 6,477,434 B1 * | 11/2002 | Wewalaarachchi et al. | 700/83 |
| 6,735,742 B2 | 5/2004 | Hatsch et al. | |
| 6,857,110 B1 | 2/2005 | Rupp et al. | |
| 7,089,512 B2 | 8/2006 | Iadanza et al. | |
| 7,293,247 B1 | 11/2007 | Newton et al. | |
| 7,379,952 B2 * | 5/2008 | Chan et al. | 1/1 |
| 7,398,503 B2 | 7/2008 | Teig et al. | |
| 7,543,251 B2 | 6/2009 | Teig et al. | |
| 7,698,662 B1 * | 4/2010 | Wu et al. | 716/104 |
| 7,971,175 B2 | 6/2011 | Ginetti et al. | |
| 2002/0183957 A1 * | 12/2002 | Croix et al. | 702/127 |
| 2003/0002320 A1 | 1/2003 | Arakawa | |
| 2003/0121019 A1 | 6/2003 | Brown et al. | |
| 2003/0229860 A1 | 12/2003 | Li | |
| 2006/0002320 A1 | 1/2006 | Costa-Requena et al. | |
| 2006/0095882 A1 | 5/2006 | Mankin et al. | |
| 2006/0101368 A1 | 5/2006 | Kesarwani et al. | |
| 2006/0253809 A1 | 11/2006 | Karniewicz | |
| 2006/0253827 A1 | 11/2006 | Karniewicz | |
| 2008/0133788 A1 | 6/2008 | Inoue | |
| 2008/0237789 A1 | 10/2008 | He et al. | |

OTHER PUBLICATIONS

R. Arora, et al., "Virtuoso® Express Pcells for better Interoperability and Performance on OA," from CDN Live, India, 2007. pp. 1-16. Obtained at http://www.cadence.com/rl/Resources/conference_papers/4.5_presentationIndia.pdf.
"Using Ciranova Python API to Develop Process Portable PyCells," Jun. 19, 2007.

* cited by examiner

*Primary Examiner* — Shyue Jiunn Hwa
(74) *Attorney, Agent, or Firm* — Vista IP Law Group, LLP

(57) ABSTRACT

An improved approach to pcell caching is disclosed that enables safe and efficient multi-user access to pcell caches. Locking structures are used in conjunction with counters to provide multi-user support for pcell caches. When a modification occurs to cached pcell data, an update is made to the appropriate counter(s). The value(s) of the counters are checked to determine whether the item of data operated upon by an entity is still valid or if another concurrent entity has made changes to the data.

25 Claims, 10 Drawing Sheets

METHOD AND SYSTEM FOR IMPLEMENTING MULTIUSER CACHED PARAMETERIZED CELLS

FIELD

The invention relates to Integrated Circuit (IC) design, and in particular, to a system and method for implementing multi-user cached parameterized cells for IC designs.

BACKGROUND

Parameterized cells (pcells) have been used for more than twenty years in designing full custom chip designs. The pcells are evaluated every time the design is opened. The highly dynamic nature of pcells introduces a level of variability that the design teams may want to control.

Over the years, the use of pcells has shown three main drawbacks. The first drawback is long design opening time. Designs containing pcells are often slow to open as the code within the pcells are evaluated in order to produce the pcell design data. The second drawback is the lack of read-interoperability of the pcells. When the pcell code is written in some proprietary language such as SKILL, third party application not linking the right pcell evaluator can not evaluate the pcells, and can thus not have access to the pcell design data. The third drawback is the lack of write-interoperability of the pcells. Third party applications have difficulty correctly editing a design containing non-evaluated pcells.

Several solutions have been proposed to partially address some of these drawbacks. One solution is to translate the design into a fully evaluated, tool neutral representation, for example GDSII. The second solution is to create a complete copy of the design. Within that copy, all instances of pcell are re-mastered into instances of a regular cell, (e.g., the regular cell being a copy of the pcell instance sub-master). This process is also known as "freezing" the design. A variant of that solution replaces the sub-masters in place with a saved version of the pcell parameters, to enable later "thawing" of the design. Another solution is provided by CiraNova of Santa Clara, Calif. This solution provides a low performance cache from external observation of the behavior of the third party application in that environment. For example, in the Virtuoso environment, it replaces all SKILL pcell instances as CiraNova pcell instances. The CiraNova pcell plug-in role is to cache on disk evaluated pcell and to re-use those from disk. The evaluation is done by invoking a sub-process, e.g., a DFII subprocess, to evaluate one pcell sub-master at a time, to store it on disk as a regular master in a temporary lib/cell/view, then to copy the layout file within a cache. The re-use is done by populating the cached regular master to a temporary lib/cell/view, to open that lib/cell/view and to copy the design data from that lib/cell/view to pcell sub-master created by a system such as OpenAccess (available from www.si2.org) when evaluating a pcell with a new set of parameters.

A better solution is to allow caching of pcell sub-master contents after being evaluated within native applications. These sub-masters are persistently saved on disk in a cache. To limit the number of disk inputs and outputs (IOs), sub-masters of the same pcell are stored in the same binary file cache. When the pcell evaluator is called to generate a new pcell variant, the cache is first consulted. If the data is already available in the cache, then the sub-master is populated directly with the cached data. Otherwise, the regular sub-master evaluation process takes place, and the sub-master elements are generated to populate the variant. One approach for implementing such cached pcells is described in co-pending U.S. application Ser. No. 11/769,568, which is hereby incorporated by reference in its entirety.

When using cached pcells, it is often desirable to allow multiple users to concurrently use or have access to the cache. This is because it is possible that multiple entities (such as, for example, processes, nodes, tasks, users, and threads) and design groups would need to simultaneously access the same set of pcell data while performing design activities. However, it is quite possible that some or all of those entities and design groups are also going to be making modifications to the pcell data. As a result, significant concurrency control and consistency problems could arise if concurrent access is to be granted to multiple users. For example, consider if a first and a second user both concurrently access the same item of data from the pcell cache. If first concurrent user makes a modification to the pcell data, and the second concurrent user does not realize such a modification had occurred, then the second concurrent user could be operating upon invalid and/or inconsistent data.

SUMMARY

Some embodiments of the present invention provides an improved approach to pcell caching that enables safe and efficient multi-user access to pcell caches. According to some embodiments of the invention, locking structures are used in conjunction with counters to provide multi-user support for pcell caches. When a modification occurs to cached pcell data, an update is made to the appropriate counter(s). The value(s) of the counters are checked to determine whether the item of data operated upon by an entity is still valid or if another concurrent entity has made changes to the date. Of particular significance is the interplay between the two types of counters introduced for the cached files, and in some embodiments, their duplication across two files. This plays an important role in optimizing the locking time of various files and thus minimizing the performance impact of synchronizing these files in a multi-user shared cache access setup.

Other and additional objects, features, and advantages of the invention are described in the detailed description, figures, and claims.

DETAILED DESCRIPTION OF EMBODIMENTS

Figure 1:
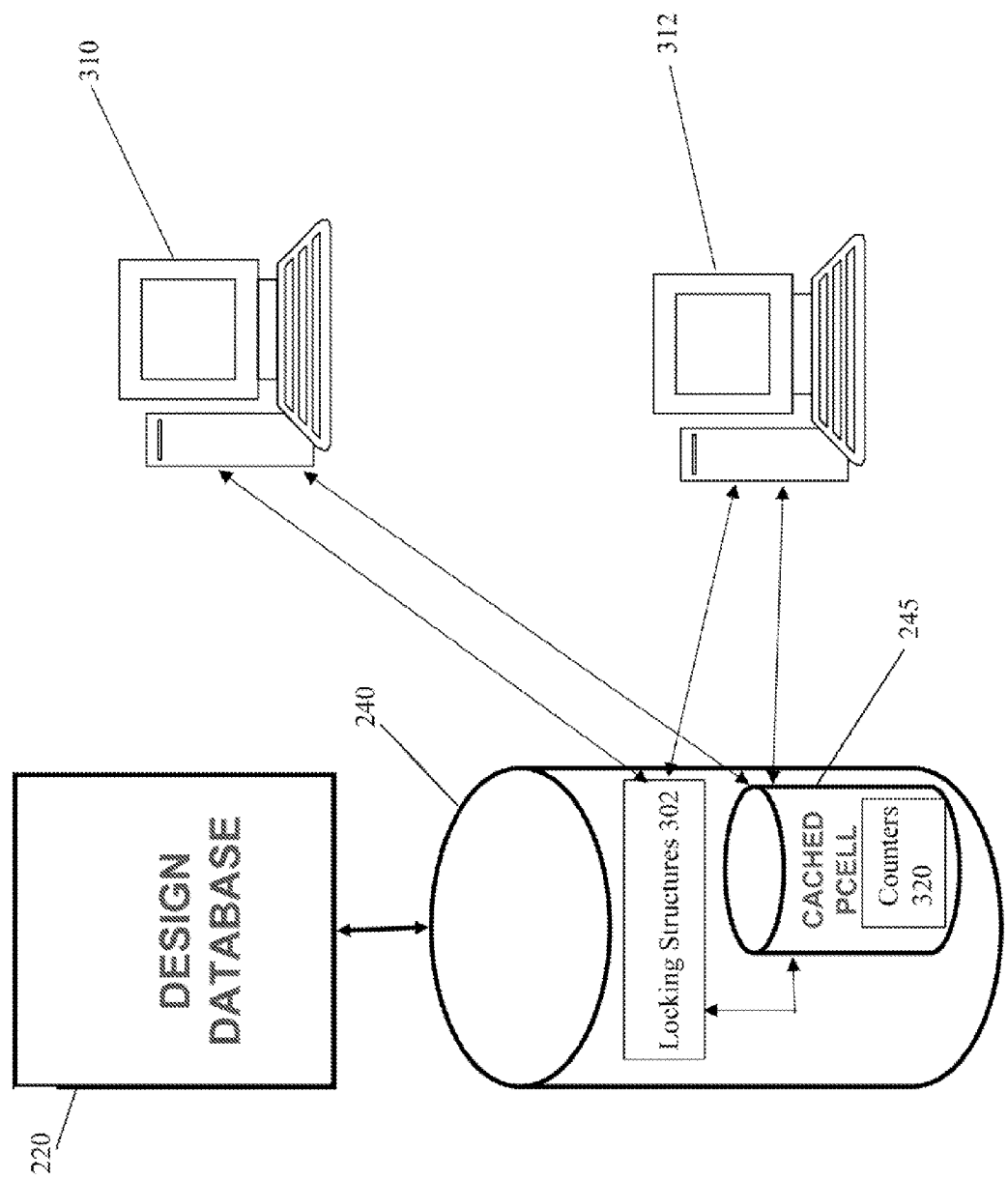
FIG. 1 illustrates a block diagram having a complete Virtuoso pcell evaluator.

The present invention provides an improved mechanism and method for allowing multiple users to concurrently access pcell data within a cache (hereinafter referred to as "cached pcell data," "cached express pcell data," "cached pcell," or "persistent pcell." According to some embodiments of the invention, locking structures are used in conjunction with counters to provide multi-user support for cached pcells. When a modification occurs to cached pcell data, an update is made to the appropriate counter(s). The value(s) of the counters are checked to determine whether the item of data operated upon by an entity is still valid or if another concurrent entity has made changes to the data.

A pcell, or parameterized cell, can be implemented as a decorated OpenAccess design (oaDesign), which has content which is dynamically created based on a set of parameters. The main attributes of a pcell are a piece of code in a given language, a list of parameter types and default value and an evaluator. A pcell instance is an instance of a pcell, e.g., an instance decorated with pcell parameter values. Evaluating a pcell instance means evaluating the pcell code against the instance parameters with the help of the evaluator in order to produce a new non-persistent oaDesign with real data; this new oaDesign is usually called a subMaster.

Known pcell caching approaches do not provide efficient and effective mechanisms to support multiple users of the cache, since they do not have the capacity to safely allow concurrent read-write access to the common shared express pcell cache. To explain, consider the following example of a problem that may arise in the case of a multi-user shared cache. Assume that there are two users (A and B) that attempt to share a common cache (e.g., that is based upon pre-existing/pre-saved data from a previous session by one of them) and the two users attempt to write concurrently to the cache using the following steps in a chronological order (or if one user writes in when the other has already read the index file and is going to read the submaster contents later):

1. User A starts the design application and opens a small design 'cv1' (i.e., by reading the cached index file and few submasters).
2. User B starts the design application and opens a small design 'cv2' (i.e., by also reading the same cached index file and few submasters).
3. User B edits the design 'cv2' creating some new submaster, deletes some of the submasters from the cache and/or updates some of the submasters/supermasters contents. Then, user B updates (re-saves) on disk. This step updates the cached index file too.
4. User A (in the same old session started in step '1') now tries to open another existing cellview cv3 (containing some pcell instances corresponding to the cached sub-masters). This step would try to access some of the pre-saved submasters using the previously read cached index file's addresses of the submaster contents.

At this point, a problem exists since the data being accessed by user A is out-of-sync with the latest addresses for the submaster data files because the cache has been already updated on disk (in step '3' by user 'B'). Thus, the user A ends up reading from the wrong locations in those submaster data files resulting in unexpected errors by the pcell caching infrastructure.

Due to this limitation, multiple designers working on different cells of a top level design (or design library) may be forced to use their own private cache directory. These single private cache directories cannot be self-sufficient independently to contain all the submasters contained in the top level hierarchical design. This means that if the top level design is supposed to be used with a third party tool (e.g., a verification tool), then a party will need to regenerate the complete cached data by reopening the entire top level design up to all the leaf levels and save the pcell cache completely.

Embodiments of the current invention provide a mechanism enabling multi-user shared cache support for pcells. As shown in FIG. 1, this means that multiple users 310 and 312 can achieve concurrent read-write access to cached pcell data 245 within a cache 240. According to some embodiments, this is implemented by providing advanced file level concurrency control 302 comprising a set of locking mechanisms associated with the cached pcell information 245 along with counters 320.

To describe some example embodiments, of the invention, a description will now be provided of a general approach for implementing pcell caching. It is noted that the present invention can be implemented using any pcell caching implementation, and is not to be limited to the illustrative approach described herein.

According to the illustrative pcell caching approach, pcell sub-master contents are cached after being evaluated within native applications. These sub-masters are persistently saved on disk in a cache. To limit the number of disk inputs and outputs (IOs), all sub-masters of the same pcell are stored in the same binary file cache.

A pcell evaluator may be implemented in a plurality of different ways. For example, as a statically linked compiled library, the pcell evaluator is compiled into a library statically linked to the application using it. In one embodiment, the application of the design platform is a Virtuoso application. In another example, as a dynamic linked compiled library, the pcell evaluator is compiled into a library dynamically linked to the application using it. In another embodiment, the application is a third party application.

Figure 2:
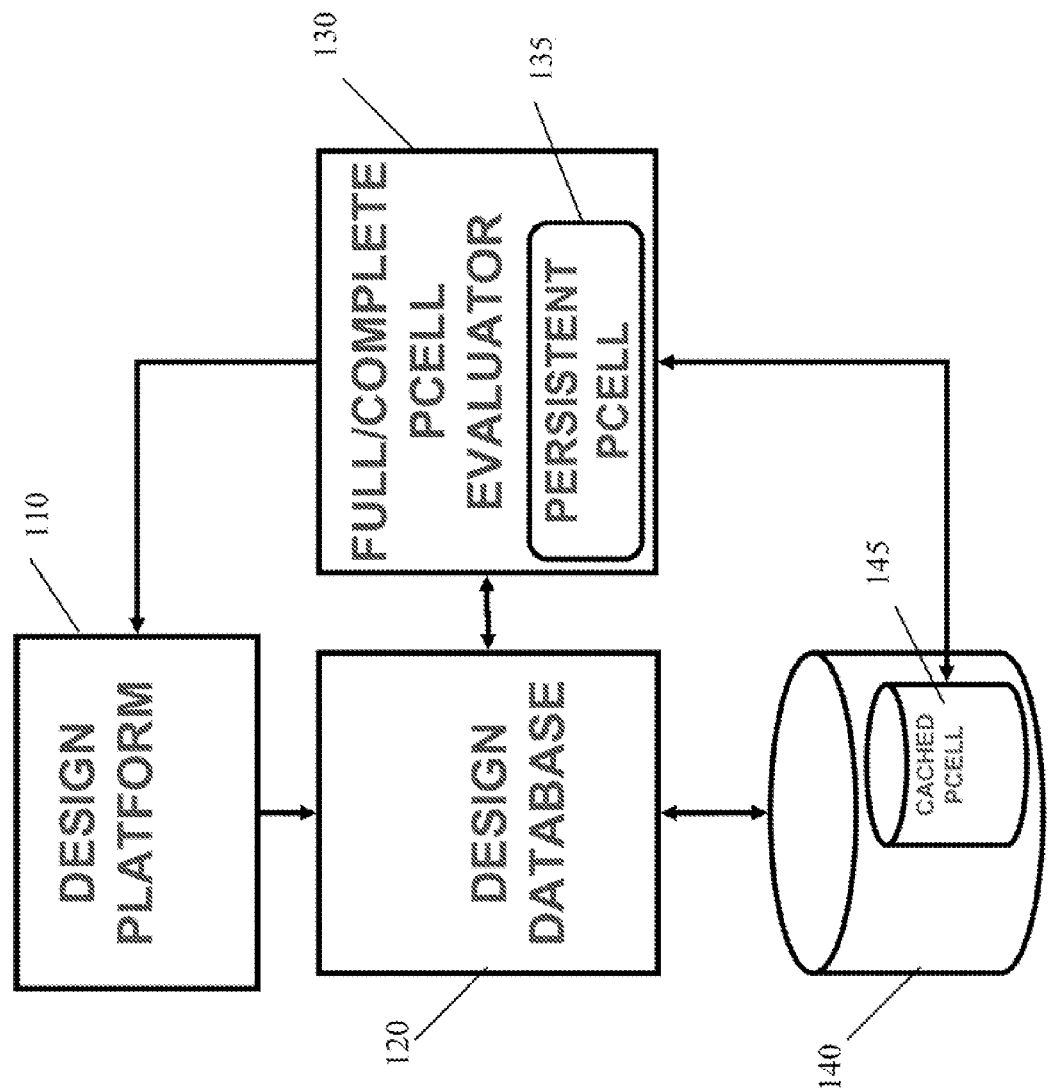
FIG. 2 illustrates a block diagram where a reduced Virtuoso pcell evaluator implemented as a plug-in is usable by a third party application.

FIG. 2 illustrates a block diagram having a complete pcell evaluator, e.g., a complete Virtuoso pcell evaluator. The complete pcell evaluator supports cached pcell sub-master contents. This is implemented as a module within the pcell plug-in. This module is responsible for filling the cache and accessing the cache, based on the user settings, and evaluating sets of parameters passed in by the application. Alternatively, the cache itself is implemented as a set of binary files stored on disk within the library structure or in a different location. Each binary file may be used for a pcell master, also known as a pcell cache file. Thus, the content of the many sub-masters of one pcell master is stored within one unique pcell cache file. There is also be a binary index file listing the evaluated pcells stored in the pcell binary file together with the parameter values used to evaluate those and some index/offset to find out the pcell data from the cached pcell file. This second file is known as the pcell index file. Storing all sub-masters of a given pcell within one file may greatly reduce the disk IOs necessary when accessing the cache. All the files (e.g., cached pcell file and its index) are stored in a location related to the cell in which the different instances of the pcell are located.

The design database evaluates a pcell instance for a given parameter set in order to fill a sub-master produced by the design database. If the user settings are such that it is required, the complete pcell evaluator may first access the pcell index file to find out whether the same pcell has been evaluated and persistently saved in the past. If so, then the index and amount of data to be read in the pcell cache file is obtained. This information together with the pcell cache file pointer is passed to a new design function, which reads that amount of data to directly fill the pcell sub-master. In the case the complete pcell evaluator does not find the right sub-master from the pcell index file or is forced by the user set-up to re-evaluate the pcell, it may get the pcell code evaluated by the evaluator of the design platform.

FIG. 2 includes a design platform 110, a design database 120, a complete pcell evaluator-in 130 and storage 140. The complete pcell evaluator in 130 includes persistent pcells 135. The storage includes a cache for storing pcells 145. The design platform 110 analyzes and evaluates a chip design having pcells. Additional design information may also be requested from a design database 120 in order to properly and efficiently analyze and evaluate a chip design. A request for information regarding the design of the pcell may be sent to the design database 120. Alternatively, the platform may directly obtain the information in the database. The design database 120 includes information that may assist the analysis and simulation of the chip design. In one approach, the design database is an OpenAccess database, but any database may be used depending on the application. The database 120 may require information that is remotely located. The design database retrieves design information that is in storage 140. Information relating to the pcell may be sent to a different location, where the design database 120 requiring pcell design information provides the request and/or design to the complete pcell evaluator.

The complete pcell evaluator 130 determines if the pcell parameter information is located within the persistent pcell cache (on disk storage). The persistent pcells allows the pcell design information to be provided to the platform with little delay. If not, then the pcell design may need to be evaluated and then, later, at user request, stored as persistent pcells. Other pcells information may be available in the cache 145. Those pcells information is retrieved and stored as persistent pcells and provided to the platform. If the pcell is already in the cache or is persistent pcell 135, then the information is provided to the design platform without being analyzed by the evaluator.

Figure 3:
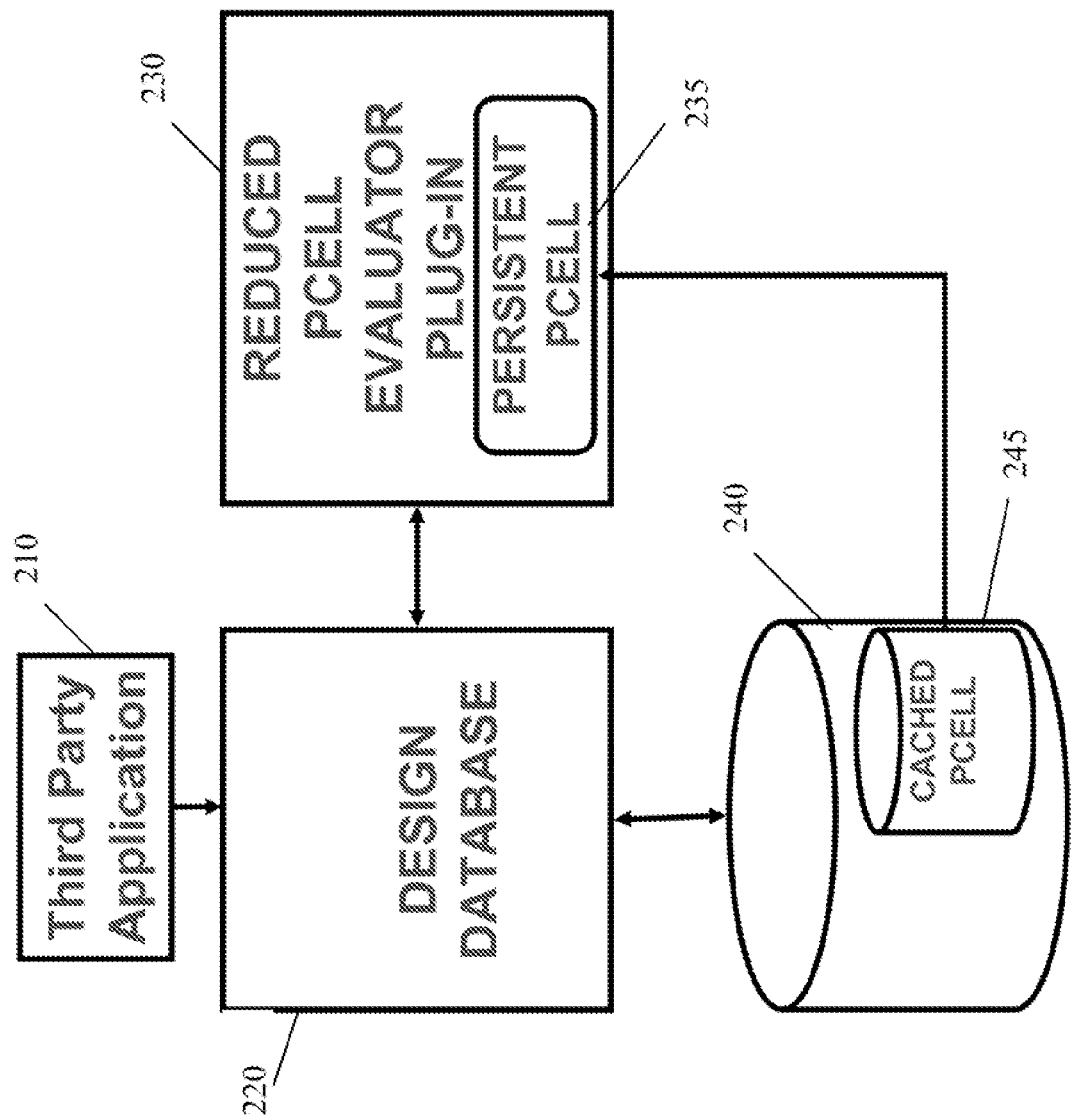
FIG. 3 illustrates a block diagram where the cached pcell is usable from a third party application.

FIG. 3 illustrates a block diagram where the cached pcell is usable from a third party application. The cached pcell is accessible by the third party application linking to the pcell Plug-in. In one approach, the third party application is unable to evaluate a pcell as the evaluator is not available to be called from the plug-in (e.g., no changing or creating of new sub-masters). In another approach, third party applications re-use pcells previously cached by an EDA design platform such as Virtuoso.

FIG. 3 includes a third party application 210, a design database 220, a pcell plug-in 230 and storage 240. The storage includes a portion for storing cached pcells 245, and the pcell plug-in includes persistent pcell 235. The third party application 210 runs processes in a proprietary language. It communicates with the design database 220 for analyzing and evaluating chip design. The design database 220 may be in a publicly available format such as OpenAccess. In another implementation, the design database 220 is also in the proprietary language which allows communication between the application and database. When the third party application 210 requires pcell information from the design database 220, it communicates with the pcell plug-in 230. The pcell plug-in checks for the pcell information in storage and attempt to retrieve the cached pcell 245 from the storage 240. If found, the information is provided to the pcell plug-in 230, which in turn is provided to the application. If it is not a persistent pcell and not in the storage, then the application will not have access to pcell sub-master design data. For design information not related to the pcell, the design database 220 may communicated directly with the application and storage 240. Note that in some embodiments, the pcell plug-in is always reduced.

Figure 4:
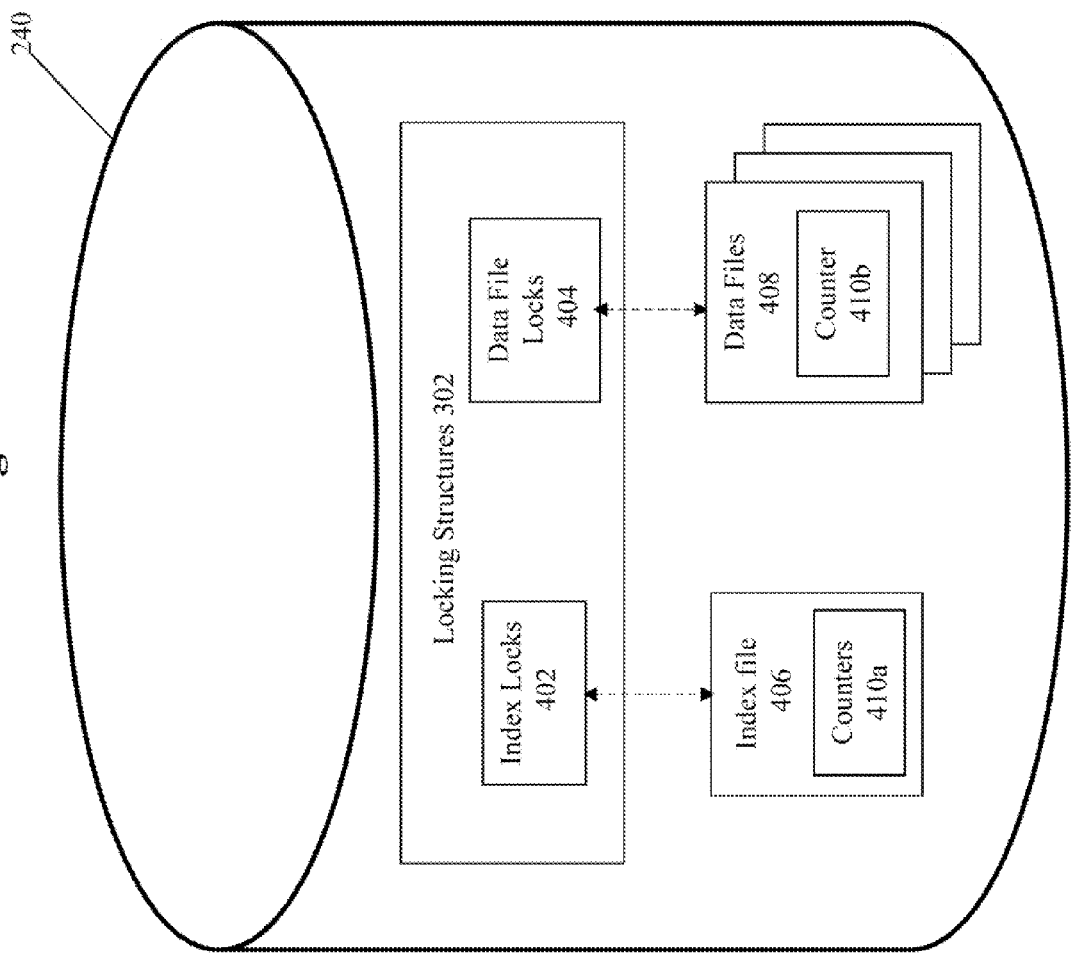
FIG. 4 illustrates example locking and file structures with which the multi-user caching invention may be implemented.

FIG. 4 illustrates example locking and file structures with which the multi-user caching invention may be implemented.

As shown in this figure, pcell data is cached using pcell data tiles 408 and an pcell index file 406. The pcell data files include a collection of files with separate file(s) for each super-master. According to some embodiments, the individual pcell data files have a file-size limit of 50 MBytes each. That means that if subMaster data coresponding to a specific supermaster is less than 50 MBytes, there will be just one cached data file for that supermaster. If the supermaster exceeds 50 Mbytes, then the cached data per superMaster will be divided in multiple files. The individual files will contain the actual contents of each pcell submaster generated in-memory, e.g., by a SKILL evaluator.

The index file 406 provides mappings for the pcell data files, e.g., for mapping of pcell variants. One function that may be provided by the index file is to provide address mapping for the pcell data files.

To support a multi-user shared caching, the index file 406 will include counters 410a for both the cached data files 408 and the index file 406. According to some embodiments of the Invention, there will be at least two types of counters in the cached files for synchronizing the updates performed by multiple users/processes concurrently during an ongoing session. A first type of counter will track the changes made to the index file 406. A second type of counter will track the changes made to the pcell data files 408. The data files themselves will also include counters 410b.

In operation, each time the index file is modified, the counter for the index file will be incremented. Similarly, each time a data file 408 is updated, the specific counter associated with that updated data file is also incremented. In this way, any user can immediately determine whether or not the data being accesses by that user has been modified by another user. This determination can be made by storing the counter value for the data being operated upon, and prior to a commit, checking again to see if the counter value had been updated by another. If the counter value has changed since the beginning of the operation, then the data file of interest that was previously loaded is no longer valid, and will need to be re-loaded by the user. However, if the counter value at the time of the commit matches the stored counter value, then the commit, can proceed since it guarantees that no other user has modified the data file.

Locking structures 302 are used to lock the index file 406 and pcell data files 408 during read and write operations. All the files being opened for read, write or update/append mode will be locked with the appropriate read-write locks for file concurrency control. According to some embodiments, both read and write locks are employed as locking structures 302. Before reading a file, a user must obtain a read lock on the file. The read lock is a shared locking structure that allows multiple users/entities to concurrently hold the read lock. Similarly, before writing to a file, the user must obtain a write lock on the file. Unlike the read lock, the write lock is an exclusive lock that only allows a single user/entity to perform write operations upon a given file at any moment in time.

Embodiments of the present invention utilize a robust locking mechanism which also minimizes the performance impact on the design opening time. To accomplish this, the locks are kept for a minimal duration to improve concurrency and reduce serialization of the file accesses. For example, in at least one embodiment, write locks on a pcell subMaster data file are released immediately after the cached submasters for that supermaster have been updated on disk and the file closed. As another example, a read lock is released immediately after reading a submaster from its pcell data file.

The counters and the locking mechanisms are used to ensure pcell cache data integrity and retain any concurrent updates in the cache by any other user(s). This is accomplished by incrementing the values of the counters for updates to related cache files, and performing checking of their latest values for cache read/write operation.

Figure 5:
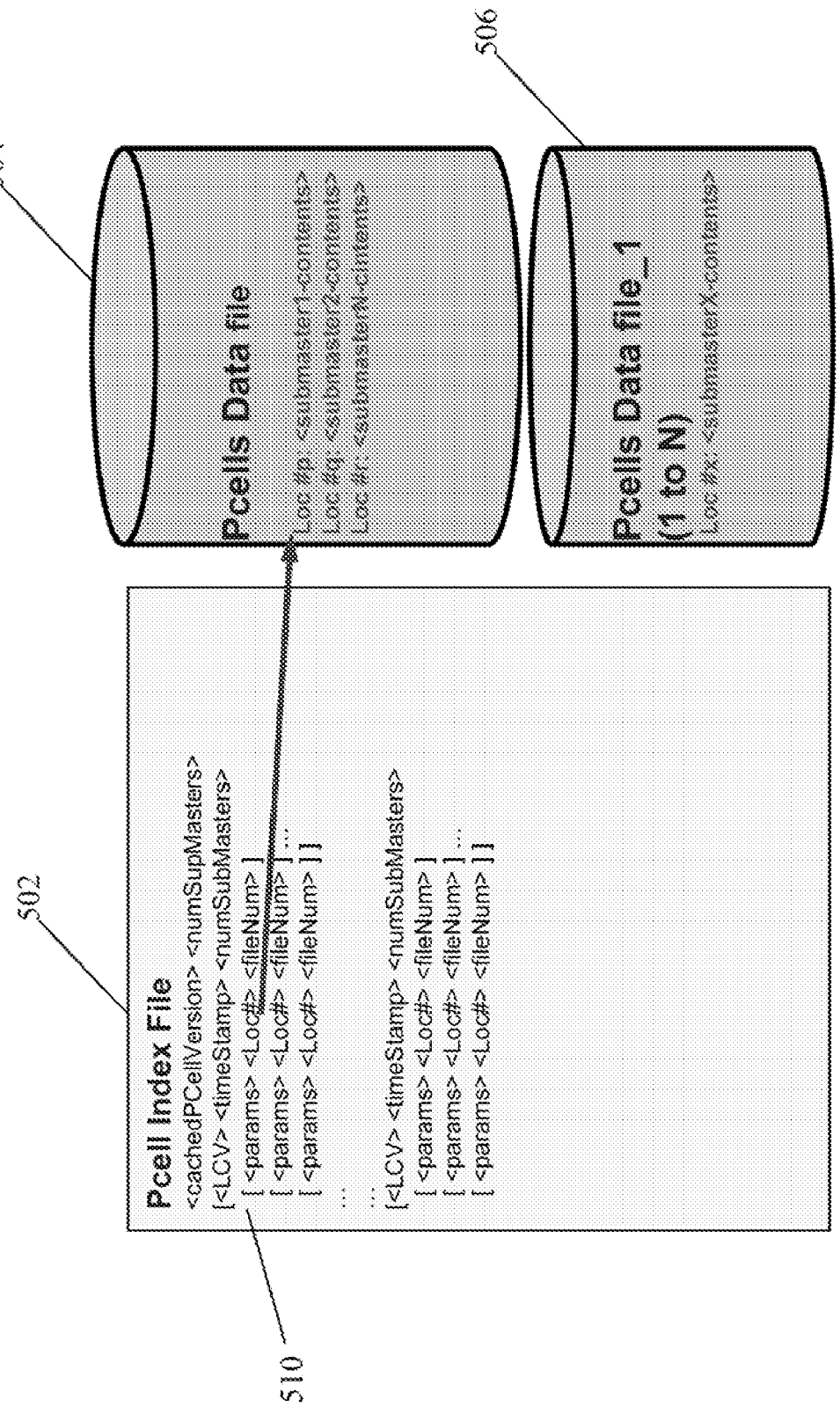
FIG. 5 illustrates file structures without the counters.
Figure 6:
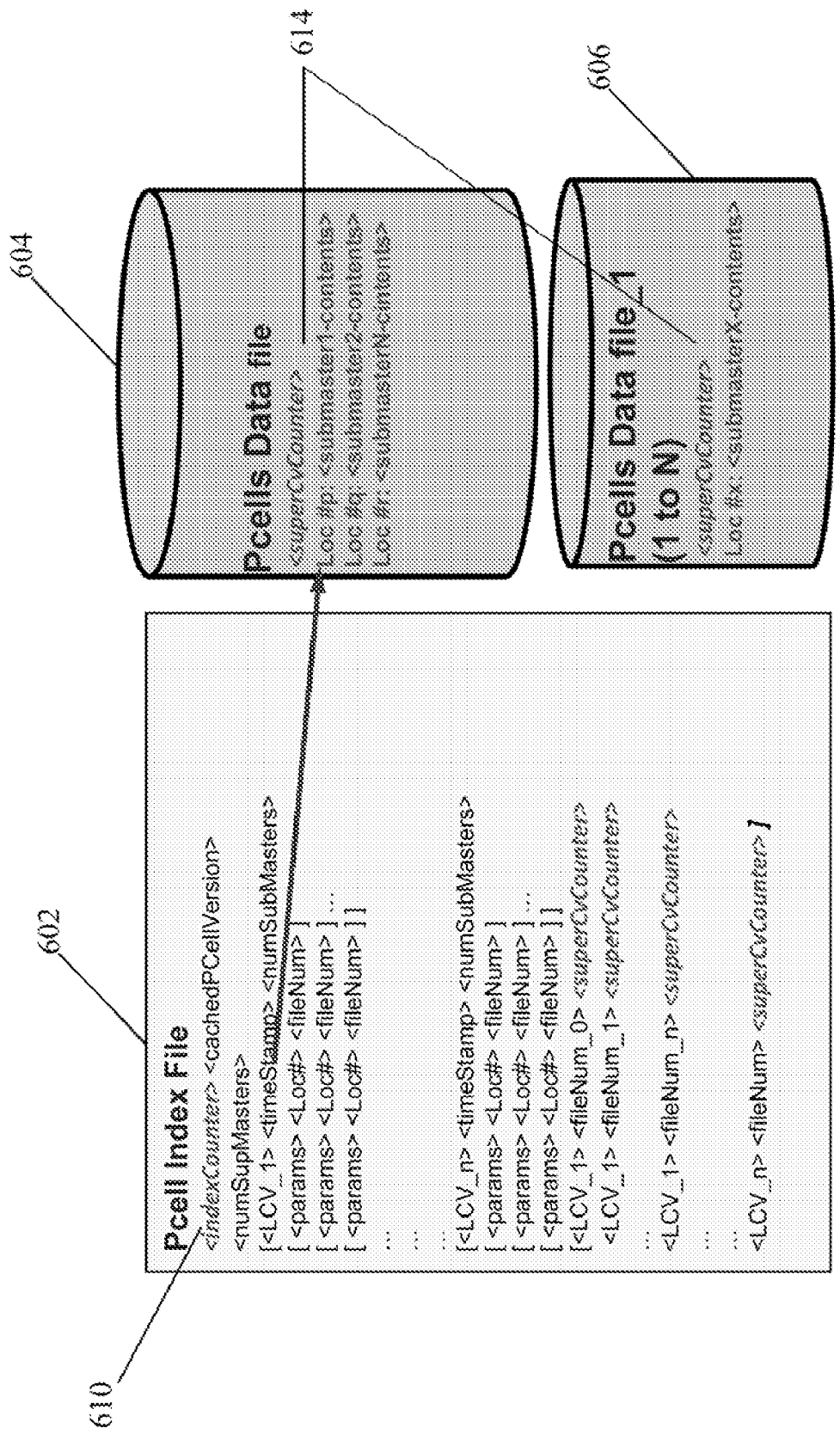
FIG. 6 illustrates same pcell file structures with counters.

FIGS. 5 and 6 illustrate how counters can be incorporated into pcell data files and pcell index files, where FIG. 5 illustrates the file structures without the counters and FIG. 6 shows the same pcell file structures with the counters.

FIG. 5 illustrates a pcell index file 502 and pcell data files 504 and 506, e.g., as used in the Virtuoso Express Pcell product, available from Cadence Design Systems Inc. of San Jose, Calif. The pcell index file 502 includes entries that point to the location of submaster data on the pcell data files 504 and 506. For example, entry 510 corresponds to the location (location "#p") of submaster1 in pcell data file 504. As noted above, in some embodiments, the individual pcell data files have a file-size limit of 50 Mbytes, where if subMaster data corresponding to a specific supermaster is greater than a designated amount (e.g., 50 Mbytes), then the cached data per superMaster will be divided in multiple files, e.g., using a <fileNum> attributed stored in the pcell index file. The individual files will contain the actual contents of each pcell submaster generated in-memory, e.g., by the SKILL evaluator. For example, these individual files can be named as <superLibName>_<superCellName>_<superViewName> [_<fileNum>].cds.

As shown in FIG. 6, to support multi-user access to the shared cache, two types of counters are placed into the cached files for synchronizing the updates performed by multiple users/entities. Data file counters 614 (identified in the figure as "<superCvCounter>") are added in the superMaster specific sub-Master data files 604 and 606. There will be one such counter added on a per file basis. If there is more than one file for a supermaster due to size limitations for the data files, then each will have a separate counter value stored in it. According to some embodiments, the data file counter 614 is stored in the first 4 bytes of its corresponding file and will get incremented on each update of that respective subMaster data file. The data file counter value is also placed into entries in the pcell index file 602. This duplication of the superCvCounter value in the index file 602 in addition to being in the subMaster data file 604 and 606 facilitates fester reading of the data file counter values, which minimizes the effort involved in checking the status of any incremental subMaster file updates in the cache during the loading of the index file 602. This advantage is achieved since the system can avoid reading all the subMaster files separately for these values.

An index counter 610 (identified as "<indexCounter>") is added in the pcell index file 602. The value of the index counter 610 is incremented when an operation is performed that may change data within the cache, e.g., based upon a save, write, update, or clear operation on the pcell cache. According to some embodiments, the index counter 610 is stored in the first 4 bytes of the pcell index file 602. According to some embodiments, each of the data file and index counters are implemented as an unsigned-integer of 4 bytes in length.

This document will now describe an embodiment of the invention for reading a subMaster from the pcell cache, e.g., as performed during an evaluation call (also referred to as "onEval( ) call"). To illustrate this process, consider the situation where there are two pcells (pcA and pcB) and their associated submasters. There are at least three types of counters stored in the respective files in the express pcell directory:

(i) indexCounter <indexC>—This counter corresponds to the counter for the index file.

(ii) superCvCounter for pcA <supCA>—This counter corresponds to the data file counter for the pcA pcell.

(iii) superCvCounter for pcB <supCB>—This counter corresponds to the data file counter for the pcB pcell.

Figure 7:
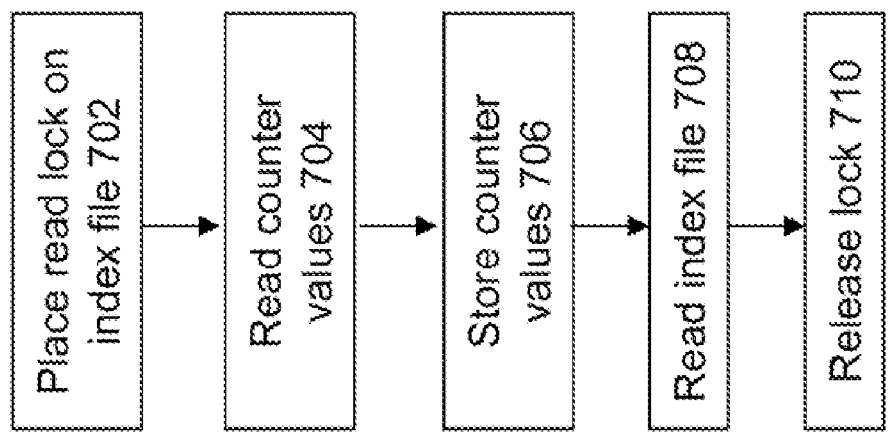
FIG. 7 illustrates a flowchart of a process for reading the index file according to some embodiments of the invention.

Upon the first onEval( ) called during a process/session, the pcell index file is read from the disk and its contents are populated in the memory. FIG. 7 illustrates a flowchart of a process for reading the index file according to some embodiments of the invention. The process begins by placing a read lock on the index file (702). The read lock is a shared lock which allows others to also concurrently read from the index file.

Next, the counter values that are present in the index file are acquired (704). For purposes of this example, the acquired counter values from the index file include the index counter <IndexC>, the counter value for pcell pcA <supCA>, and the counter value for pcell pcB <supCB>. The acquired counter values are stored in a virtual memory (VM), which provides the appearance of contiguous working memory, while in fact the actual memory may be physically fragmented and may even overflow on to disk storage (706). For example, the value for IndexC could be stored using a variable for the initial index counter value initIC (initIC=indexC). The counter value for pcell pcA could be stored using a variable initPCA for the pcA pcell (initPCA=supCA). Similarly, the counter value for pcell pcB could be stored using a variable initPCB for the pcB pcell (initPCB=supCB).

The process performs a reading of the index file in VM (708). This action is used to read the mapping and location information from the index file. Once the required information has been read from the index file, the read lock acquired during action 702 is released (710).

Based upon the information from the index file, a check is performed for the existence of the desired unique submaster in the cache. The presence for the submaster is checked in the index file, which has been loaded into memory based upon the action do FIG. 7. If the submaster is found in the index file, then it is read from the corresponding pcell data file using the process of FIG. 8. The process of FIG. 8 begins by placing a read lock on the submaster file of interest (802). For example, assume that there is an intent to read a unique submaster of the pcA pcell in the cache on disk. Therefore, a shared read lock is placed on the submaster file for the pcA pcell (lib_pcA_view.cds). The shared lock means that other users/processes can also concurrently acquire a read lock and read the contents of this submaster file.

Next, the counter value is read for the submaster of interest (804). In the present illustrative example, it was assumes that there is an intent to read a unique submaster of the pcA pcell in the cache on disk. Therefore, the counter value (supCVA) for pcell pcA is read. This supCVA value is acquired read from the pcell data file for pcA.

The initial counter value that was read during the process of FIG. 7 is then checked against the newly acquired counter value for the pcell (806). If the values match, then it is clear that no other user or process has updated the pcA pcell since the index file was originally accessed, and the address for the pcell data file acquired. Therefore, the user/process can assume that it is safe to read the submaster data from the identified pcell data file for the pcA pcell (808). After the pcell data has been read, the read lock on the pcell data file for pcA can be released (810).

Figure 8:
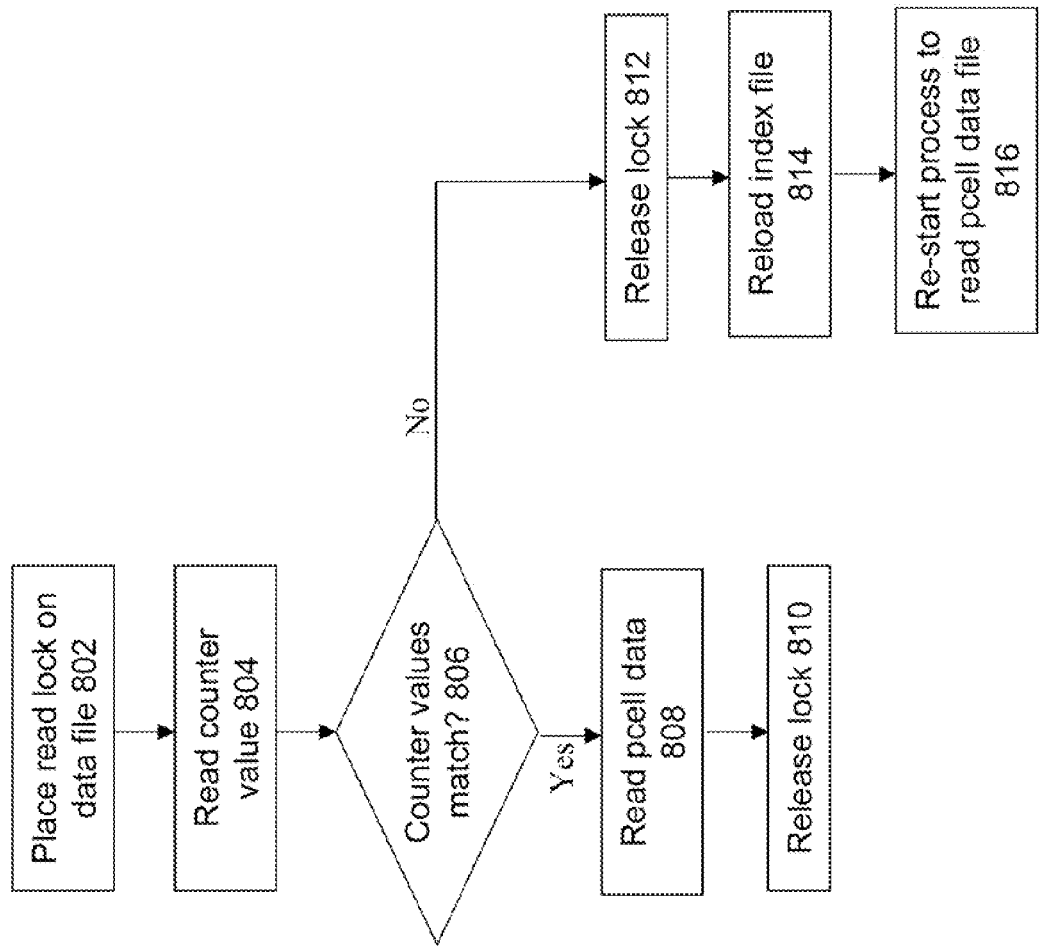
FIG. 8 illustrates a process for reading from a pcell data file.

If the initial counter value that was read during the process of FIG. 7 does not match the newly acquired counter value for the pcell, then it can be assumed that the another user/process has changed or updated the pcell data in the interim, and therefore the original values read from the index file may no longer be valid. Therefore, the user/process will need to reload the values again to ensure that the most recent version of the data is being operated upon. The lock will be released at this point (812). This is done to address a potential deadlock scenario here. This is useful, for example, since the lib_pcA_view.cds file is read-locked, if another entity or user is writing other files in the cache and has locked the index file already they could be waiting to obtain a write-lock on the same file now before completing the save operation to release the lock on the index file. The index file is then reloaded (814). This will provide the most up-to-date mappings and information about the pcell data files. Thereafter, the process of FIG. 8 is re-started to read the pcell data file (816).

Figure 9:
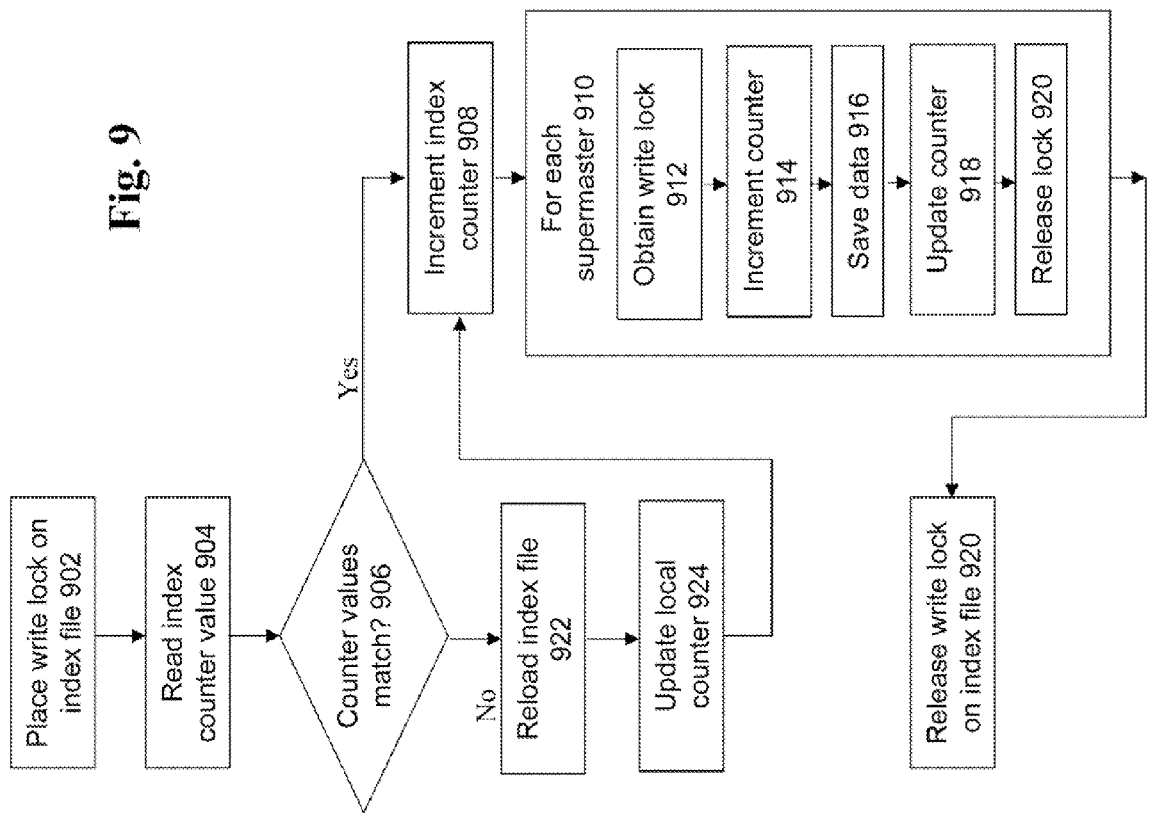
FIG. 9 illustrates a process for saving data within a pcell cache.

FIG. 9 Illustrates a process for saving data within the pcell cache. This type of save operation would be performed when items of data in the cache are created, updated, modified, or deleted. Initially, a write lock is obtained on the index file (902). Next, the latest value of the index counter is read from the index file on disk (904).

The initial counter value that was read during the process of FIG. 7 is then checked against the newly acquired index counter value (906). If the initial counter value that was read during the process of FIG. 7 does not match the newly acquired index counter value, then it can be assumed that the another user/process has changed or updated the index file in the interim, and therefore the original values read from the index file may no longer be valid. Therefore, the user/process will need to reload the index file to ensure that the most recent version of the data is being operated upon (922). The value of the local-stored index counter value will also be updated (924). The process will then proceed to increment the index counter in the index file (908). The index counter is being updated because a change is going to occur to the data in the pcell cache, and hence may change mapping values in the index file.

The next set of actions is then performed for each supermaster in memory (910). First, a write lock is acquired on the pcell data file(s) that are being operated upon and saved to in some way (912). For example, the write lock will be acquired if there is a need to write at least one new subMasters data per supermaster or update the existing file for any supermaster update on disk. Assume that the save operation is needed for the pcell data file associated with pcA (lib_pcA_view.cds). Next, the counter for the pcell data file that is in memory is incremented and saved (supCV=initPC++) (914). At this point, a save operation is performed for the respective submasters (916). At this point, the appropriate data file counter in the index file is updated after the superMaster has been processed (918). Thereafter, the write lock on the pcell data file can be released (920).

The write lock on the index file can then be released (920). At this point, other entities and users can then begin writing to the index file.

As noted above, the supermaster specific files have separate counters. Therefore, if pcA's submasters exceed 50 MByte and are stored in 2 separate files, there will be supCA and supCA_2 for their respective pcell data files. The counter values will be stored in both the index file as well as in the beginning of their respective pcell date files. If multiple files are being updated, then the current example described herein will involve locking and saving to multiple files.

For another example, consider the situation when the desired submaster is not present in the index file loaded already in VM (tried by UserA). In this example, situation, there is a possibility that the submaster may have already been cached on disk by some other user (UserB). One option is to ignore it unless UserA performs a reload/sync-up operation on the pcell cache or if it is read based upon an identified counter mismatch as decribed above.

Another alternative is to check for the existence of an entry in the index file in the VM for the superMaster of interest. If this entry does not exist then a determination is made whether the corresponding data file exists on disk. For example, if there is no entry for superMaster 'pcA' in the index file in VM, then a check is made whether lib_pcA_view.cds file exists on disk. If so, then the index file is re-loaded/resynched from disk. A check can be added to avoid any infinite recursion due to some unforeseen corrupted data. This is made to determine whether there is an entry now for supermaster 'pcA' in the index file in VM. If so, then the present process is recursively called.

The present concurrency control mechanism is employed during operations such as save, cleanup, and regeneration of the cache. The pcells files are updated/saved with the latest contents during the operations/actions of saving or updating a design. During the saving/updating of the pcell cache on disk, the additional/new variants are tracked and updated such that the cache becomes the superset of all users, and not just a snapshot of any single user. For multi-user operations, a write lock will also be placed on the pcell index file as disussed above.

To synchronize with any other potential updates by some other user concurrently, the index counter value is used to decide whether it is needed to re-load the index file, and to proceed towards the pcell cache operation. An incremental save can be performed to retain the data added by other users and leverage it to reduce the save time.

For plug-ins for third party applications, the cache read operation described above can be used for identifying a pre-evaluated cached submaster. For the read operation, the plugin will also check for the superCVCounter values on the invocation of the onEval( ) function. If the supCVCounter value is obsolete, the plugin will re-load/sync-up the pcell index file from disk before accessing the desired submaster.

Optimizations can be performed to reduce the waiting times when acquiring the read and write locks. The wait time during acquiring a read-write lock can be optimized for minimal impact on the end user in numerous scenarios.

For example, consider a first scenario in which an application (e.g., a DFII/Virtuoso application) has SKILL language evaluation capability, while acquiring the read lock on the pcell data file. If the lock cannot be placed on the pcell data file due to an existing write lock on that file, there are two options. The first option is to wait for the existing write lock on that file to be released. The second option is to go ahead and eval the respective submaster. According to some embodiments, it is preferred to use the second option, by using the available SKILL evaluator as this approach would be faster rather than waiting for the writing of potentially a large quantity of data in the file.

As another example, consider the circumstance of a plugin that does not have the SKILL evaluation capability which engages in the process of acquiring the read lock on the pcell data file. If the lock cannot be placed on the pcell data file due to an existing write lock on that file, then waiting will occur for the write lock to be released. A timeout can be imposed before the process gives up on that waiting period. A message will be provided to the user on an intermittent basis when the process is waiting for the lock, so that the user is aware of the slow speed and can take any action to avoid locking conflicts, if frequent, in a shared cache scenario.

Another scenario could arise while saving the pcell cache. If the write lock on the index file cannot be acquired, then the process will wait, with a timeout period, and an appropriate message will be displayed. If the timeout occurs, then the save process will be skipped and no file will be updated on disk. If the write lock cannot be acquired on a pcell data file while writing the pcell cache, then it is possible that this is due to the read lock already existing on that file. The process will wait for that read lock to be released and then acquire the write lock. However, in the worst case, if the write lock cannot be acquired before timeout (e.g. if another process having a read lock on a pcell data file has been suspended), this can result in data corruption in the pcell database. This issue will be addressed by restoring back the previous versions of data files already updated in this save operation to that point, which can be implemented by maintaining backups of the data files being saved by the current save operation which can be used to restore back the original index file as well as the previously existing data files. Then, an appropriate message will be delivered to the user that the save operation did not succeed.

Therefore, what has been described in an improved approach that provides safe and efficient multi-user capability to pcell caches. The multi-user shared cache with concurrent read & write access capabilities offers the following numerous advantages over prior solutions of using a single user private cache. For example, one advantage is that there is no need to regenerate the cache for a full chip/block level verification run, which provides improved layout design productivity. In many cases of a layout design project involving multiple users, any one user rarely sees the entire design hierarchy. Many users see smaller subsets of the overall design. If each user has a private local cache, then any one cache will only be a subset of the entire design. But it is this entire design that goes through the actual flow including the actions of verification and stream-out. The implications are that to ensure 3rd party interoperability, a separate fully populated private cache may need to be generated—the equivalent of the super set of all individual caches. This means that the super set cache may also need to be maintained. The use of shared read-write enabled cache across multiple users will avoid this problem and save the time required to regenerate the cache before each verification run using a $3^{rd}$ part tool, which will provide better layout design productivity.

In addition, the present approach will save storage space. In case of using a multi-user shared cache, if one user has already performed the evaluation, all other users can leverage that immediately and benefit from it. The users do not need to keep duplicate copies of the same submaster in their individual local cache directories, which will result in significant savings for disk space usage.

System Architecture Overview

Figure 10:
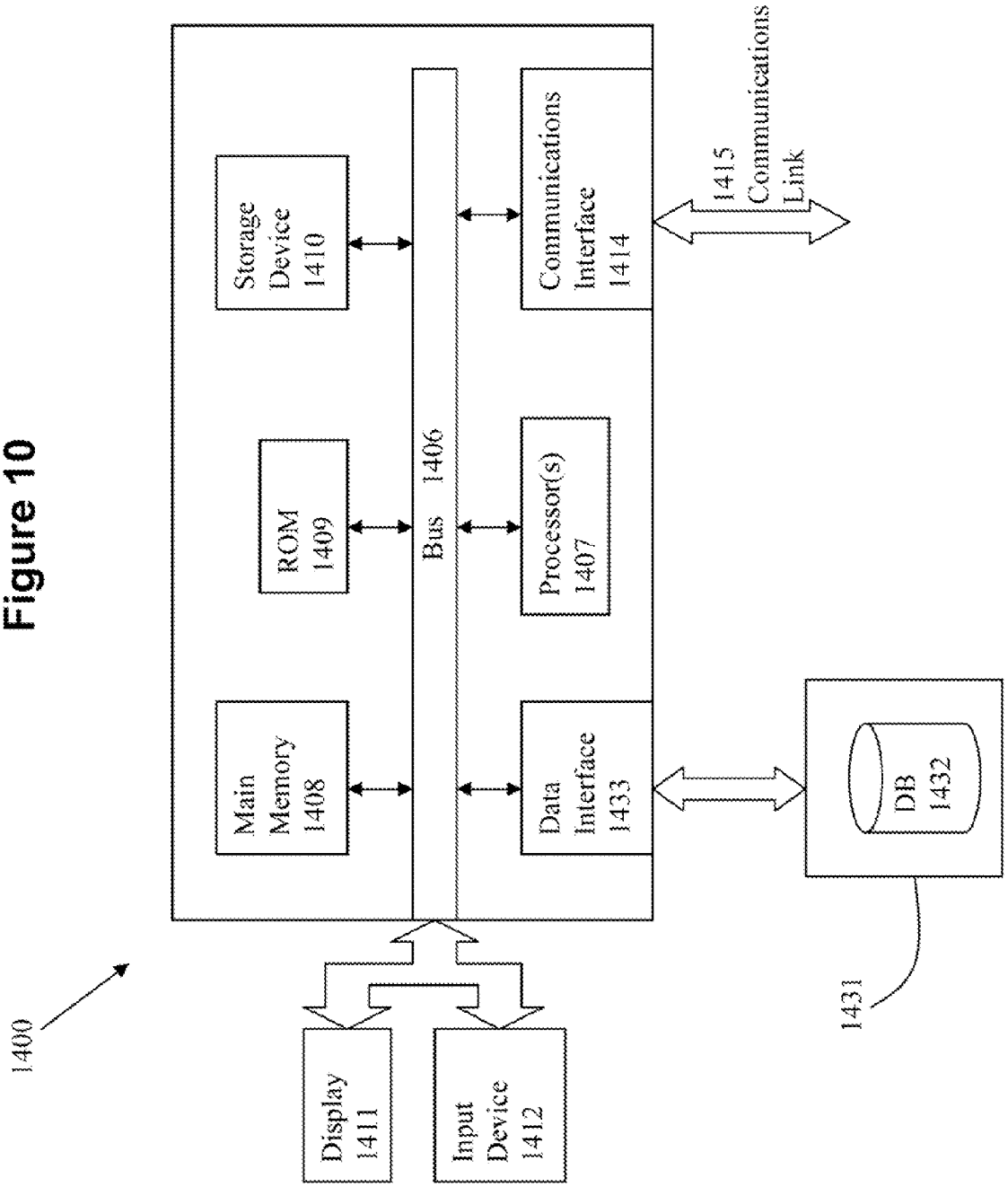
FIG. 10 depicts a computerized system on which a method for caching pcells can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for implementing multi-user access to cached parameterized data for an electronic design, comprising:
    a memory for storing a cached parameterized cell;
    at least one processor that is to use at least:
        an index to reference the cached parameterized cell, which includes a set of parameters that have been evaluated against a set of instance parameters for the set of parameters to represent a block of circuit elements in the electronic design, within the memory;
        one or more locking structures to lock at least read access to the cached parameterized cell based at least in part upon a criterion, wherein at least one of the one or more locking structures comprises a shared lock;
        an index counter to track one or more first updates to the index; and
        a data counter to track one or more second updates to the cached parameterized cell.

2. The system of claim 1 in which the data counter is duplicated at a location of the index counter.

3. The system of claim 1 in which the index counter is located in the index.

4. The system of claim 1 in which the data counter is located in a data file that includes information about the cached parameterized cell.

5. The system of claim 1 in which the one or more locking structures comprises at least one exclusive write lock and at least one nonexclusive read lock.

6. The system of claim 1 where the one or more counter values match for a parameterized cell, then for a supermaster, the at least one processor is further to:
- obtain a lock on the supermaster;
- increment a counter for the supermaster;
- save data for the supermaster; and
- release the lock on the supermaster.

7. A method for implementing multi-user access to cached parameterized data for an electronic design, comprising;
- using at least one processor to perform a process, the process comprising:
  - locking, by using one or more locking structures that comprise at least one shared lock, at least read access to a cached parameterized cell and obtaining mapping information for the cached parameterized cell based at least in part upon a criterion, in which the cached parameterized cell includes a set of parameters that have been evaluated against a set of instance parameters for the set of parameters to represent a block of circuit elements in the electronic design;
  - acquiring one or more counter values corresponding to the cached parameterized cell;
  - checking the one or more counter values to determine whether data for the cached parameterized cell should be accessed;
  - accessing the data for the cached parameterized cell where the one or more counter values indicates that the data can be trusted; and
  - re-acquiring the mapping information for the cached parameterized cell where at least some of the one or more counter values indicates that the data cannot be trusted.

8. The method of claim 7 in which an index is accessed to obtain the mapping information.

9. The method of claim 8 in which the one or more counter values comprise an index counter that is used to track changes to the index.

10. The method of claim 9 in which the index counter is located in the index.

11. The method of claim 8 in which the one or more counter values comprise a data counter that is used to track changes to the data.

12. The method of claim 8 in which the one or more counter values are duplicated at both the index and the cached parameterized cell.

13. The method of claim 7 in which a data counter is located in a data file that includes the data about the cached parameterized cell.

14. The method of claim 7 in which the one or more locking structures comprise at least one exclusive write lock and at least one nonexclusive read lock.

15. The method of claim 7 in which a lock is placed on an index prior to reading the one or more counter values, wherein the lock is released after the one or more counter values have been acquired.

16. The method of claim 7 in which an update is performed by placing a write lock on an index file.

17. The method of claim 7, when the one or more counter values match for the parameterized cell, an index counter is updated.

18. The method of claim 7, when the one or more counter values match for the parameterized cell, for a supermaster, the process further comprises at least:
- obtaining a lock on the supermaster;
- incrementing a counter for the supermaster;
- saving data for the supermaster; and
- releasing the lock on the supermaster.

19. The method of claim 7 in which parameterized cell data is split into multiple files when the parameterized cell data exceeds a threshold, and a separate counter exists for each of the multiple files.

20. The method of claim 7, in which the act of locking at least the read access to the cached parameterized cell is performed by using the shared lock that is shared among multiple entities that are to perform the read access to the cached parameterized cell.

21. A computer program product that includes a non-transitory computer readable medium, the computer readable medium comprising a plurality of computer instructions which, when executed by a processor, cause the processor to execute a method for implementing multi-user access to cached parameterized data for an electronic design, the method comprising:
- locking, by using one or more locking structures that comprise at least one shared lock, at least read access to a cached parameterized cell and obtaining mapping information for the cached parameterized cell based at least in part upon a criterion, which includes a set of parameters that have been evaluated against a set of instance parameters for the set of parameters to represent a block of circuit elements in the electronic design;
- acquiring one or more counter values corresponding to the cached parameterized cell;
- checking the one or more counter values to determine whether data for the cached parameterized cell should be accessed;
- accessing the data for the cached parameterized cell where the one or more counter values indicates that the data can be trusted; and
- re-acquiring the mapping information for the cached parameterized cell where at least some of the one or more counter values indicates that the data cannot be trusted.

22. The computer program product of claim 21 where the one or more counter values match for a parameterized cell, then for a supermaster, the method further comprising:
- obtaining a lock on the supermaster;
- incrementing a counter for the supermaster;
- saving data for the supermaster; and
- releasing the lock on the supermaster.

23. The computer program product of claim 21, the method further comprising:
- tracking an index, which references the cached parameterized cell, by using at least the one or more counter values; and
- tracking the cached parameterized cell by using at least the one or more counter values.

24. The computer program product of claim 23, the method further comprising:
- improving a locking time of the cached parameterized cell or the index by duplicating at least some of the one or more counter values.

25. The computer program product of claim 21, in which the at least one criterion comprises a time point when the data for the cached parameterized cell is read in a read operation.

* * * * *